United States Patent [19]

Godwin et al.

[11] 3,794,815

[45] Feb. 26, 1974

[54] TOTALIZER FOR WEIGHING SYSTEMS

[75] Inventors: Gilbert A. Godwin, Oakland; Armando A. Aiguesvives, Maplewood, both of N.J.

[73] Assignee: Howe Richardson Scale Company, Clifton, N.J.

[22] Filed: Oct. 14, 1971

[21] Appl. No.: 189,127

[52] U.S. Cl...... 235/92 WT, 235/92 R, 235/92 CV, 340/347 AD

[51] Int. Cl. .......................................... H03k 21/30

[58] Field of Search..... 235/92 WT, 92 CA, 92 CV; 340/347 AD

[56] References Cited

UNITED STATES PATENTS

| | | | |
|---|---|---|---|
| 2,816,226 | 12/1957 | Forrest | 235/92 CA |
| 3,525,991 | 8/1970 | Kohler | 340/347 AD |
| 3,589,457 | 6/1971 | Joos | 235/92 WT |

*Primary Examiner*—Paul J. Henon
*Assistant Examiner*—Robert F. Gnuse
*Attorney, Agent, or Firm*—Norris & Bateman

[57] ABSTRACT

A weighing system totalizer wherein a pulse generator produces pulses at a constant repetition frequency to be counted in by a counting device, wherein a digital-to-analog converter cumulatively converts the generator-produced pulses into a feedback d.c. signal, and wherein a signal comparing circuit is responsive to the feedback d.c. signal and to a weight-representing d.c. signal to start and stop operation of the pulse generator for providing a generator-produced pulse train in which the number of pulses is representive of the magnitude of the weight-representing d.c. signal.

11 Claims, 5 Drawing Figures

INVENTORS
GILBERT A. GODWIN
ARMANDO A. AIGUESVIVES

BY Norris & Bateman
ATTORNEYS

PATENTED FEB 26 1974 3,794,815

INVENTORS
GILBERT A. GODWIN
ARMANDO A. AIGUESVIVES

BY Norris & Bateman
ATTORNEYS

TOTALIZER FOR WEIGHING SYSTEMS

FIELD OF INVENTION

This invention relates to devices for converting an analog signal representing weight into digital impulses.

SUMMARY AND OBJECTS OF INVENTION

A major object of this invention is to provide a novel circuit for converting a weight-representing analog signal into a digital signal in a weighing system.

According to this invention, a d.c. signal, which is a measure of the weight of a load, is applied to the input of a signal comparator circuit which controls operation of a pulse generator. The pulse generator supplies pulses at a substantially constant repetition frequency for driving a pulse counter. A feedback loop is connected between the output of the pulse generator and the input to the comparator circuit and contains a digital-to-analog converter for cumulatively converting the digital output of the pulse generator into a d.c. signal.

In the preferred embodiment, a binary counter is in the feedback loop to count in the pulses supplied by the pulse generator and to provide a digital output that changes correspondingly with each pulse that is counted in. This digital output is applied to the input of the digital-to-analog converter. As a result, the absolute magnitude of the d.c. signal at the output of the digital-to-analog converter will incremently increase by a constant, predetermined value for each pulse that is counted in by the binary counter in the feedback loop. In the preferred embodiment described herein, the converter-produced d.c. signal is fed back to the input of the signal comparator circuit with a polarity that is opposite to that of the weight-representing signal to thereby offset the weight-representing signal. The signal comparator is responsive to the algebraic summation of the weight-representing signal and the fed-back signal to condition the pulse generator for generating pulses until the algebraic summation of comparator input signals reaches a predetermined value. When the algebraic summation of the comparator input signals reaches this predetermined value, the signal comparator circuit cuts off the supply of generator-produced pulses.

Since the output of the digital-to-analog converter is dependent upon the number of pulses supplied by the pulse generator and since the number of pulses supplied by the pulse generator is dependent upon the relative values of the weight-representing signal and the output of the digital-to-analog converter, the number of pulses supplied up to the cutoff point will be closely proportional to the weight of the load being weighed.

The foregoing totalizer circuit of this invention is relatively simple and inexpensive as compared with systems of comparable accuracy in which the weight-representing d.c. signal is recurrently sampled and in which the samples are converted into weight-representing pulse trains. In addition, improved linearity and resolution is readily and easily achieved with the totalizer circuit of this invention especially by providing a pulse multiplier circuit in the feedback loop between the output of the binary counter and the input to the digital-to-analog converter. The multiplier circuit is conditioned to multiply the number of generator-produced pulses, and the multiplied pulse train is counted by the binary counter to supply a digital signal that is a multiple of the number of pulses in the generator-produced pulse stream. As a result, a greater part of the available range of the digital-to-analog converter is utilized to improve the linearity and resolution of the converter and hence of the overall circuit.

Furthermore, the pulse generating equipment that is utilized in the totalizer circuit of this invention mainly comprises an oscillator which is biased on and off by the signal from the output of the signal comparator. Therefore no accuracy-impairing linearity or resolution problems of any significance are encountered with the pulse generator in the circuit of this invention.

According to another circuit object of this invention a novel network is employed for selectively enabling and inhibiting the impulse-generating oscillator in the totalizer circuit described above. According to the preferred embodiment of this invention, the oscillator is of the relaxation type, and the enabling and inhibiting network comprises a resistor which is selectively connected to shunt the impulse-producing capacitor in the oscillator to thereby prevent the capacitor from being charged.

According to another object of this invention, a network is responsive to the oscillator-controlling signal from the signal comparator circuit to indicate when the totalizer has updated itself.

Further objects of this invention will appear as the description proceeds in connection with the appended claims and annexed, below-described drawings.

DETAILED DESCRIPTION

Figure 1:
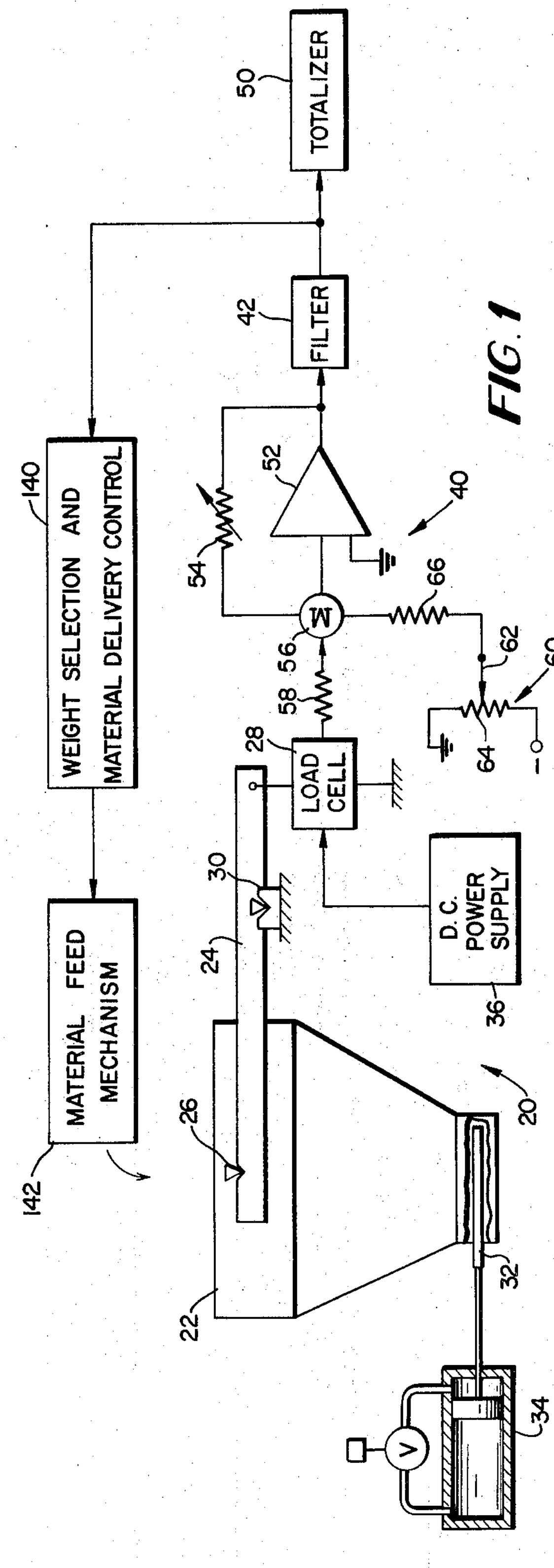
FIG. 1 is a generally schematic diagram of a weighing system incorporating the principles of this invention.

Referring to the drawings and more particular to FIG. 1, the weighing system incorporating the principles of this invention is generally designated at 20 and comprises a storage hopper or bin 22 for receiving material to be weighed. Storage hopper 22 is suitably suspended from and supported by one end of a fulcrumed level 24 by a knife-edge assembly 26. A load cell 28 is suitably connected to the other end of lever 24 as shown. Lever 24 is pivotally supported by a pivot and fulcrum assembly indicated at 30. A discharge gate 32 is provided for selectively closing and opening the bottom of hopper 22 and is operated between open and closed positions by a suitable fluid motor 34. Load cell 28 may be of any suitable, conventional form such as a resistance strain guage type that is excited by a suitable d.c. power supply source 36.

The foregoing scale construction may be utilized in a batch weighing system as described in U.S. Pat. No. 3,528,518 issued on Sept. 15, 1970 to G. C. Mayer for Automatic Batch Weigher. It will be appreciated, however, that the totalizer of this invention has numerous other applications. For example, it may be utilized in a vehicle platform weighing system for weighing vehicles and/or loads supplied to a vehicle on the weighing platform. In such a weighing system, the load-receiving structure is in the form of a platform.

Furthermore, any form of transducer may be utilized for converting the weight of the load applied to the load-receiving structure into a d.c. signal whose level is a function of the applied load. For example, a linear variable differential transformer transducer may be utilized in place of the load cell shown in FIG. 1.

It also will be appreciated that the load-receiving structure may be directly supported on a series of the above-mentioned type of load cells in a suitable, conventional manner.

With continued reference to FIG. 1, the d.c. signal output voltage of load cell 28 is applied to a conventional signal conditioning and amplifying circuit 40 and then through a suitable filter 42 to the totalizer of this invention which is generally indicated at 50.

Circuit 40 may be of any suitable conventional form such as that described in the above-identified U.S. Pat. No. 3,528,518. As shown, circuit 40 comprises a signal conditioning, operational amplifier 52. A variable feedback resistor 54 couples the output signal voltage of amplifier 52 back to a summing junction 56 which is connected to the input of amplifier 52. The unshown bridge of load cell 28 has its output connected through a summing resistor 58 to summing junction 56. Resistor 54 provides a span adjustment for the voltage range impressed upon the circuit. Operating power for amplifier 52 may be derived from any suitable source.

A dead weight tare adjustment is provided by a potentiometer 60 having a movable wiper or arm 62 which is adjustable along a resistor 64. Resistor 64 is connected across a suitable power supply source which may be derived from power supply 36. The voltage impressed on wiper 62 is supplied through a summing resistor 66 to junction 56. The load cell output signal voltage and the dead weight potentiometer signal voltage will be opposite in sign. Wiper 62 is adjusted to offset or tare out the weight of scale parts acting on load cell 28 to thereby provide a substantially zero amplifier input voltage signal condition at junction 56 when hopper 22 is empty. Thus, the algebraic summation of input signal voltage at junction 56 will be closely proportional to the amount of material delivered to hopper 22. It will be appreciated that the level of the output load cell signal voltage is closely proportional to the weight of material delivered to hopper 22 and to the weight of the hopper and other scale parts action on load cell 28.

The output of amplifier 52 is applied to the input of filter 42 which filters out a.c. components that may be superimposed on the d.c. signal. Filter 42 may be of any suitable, conventional form.

Figure 2:
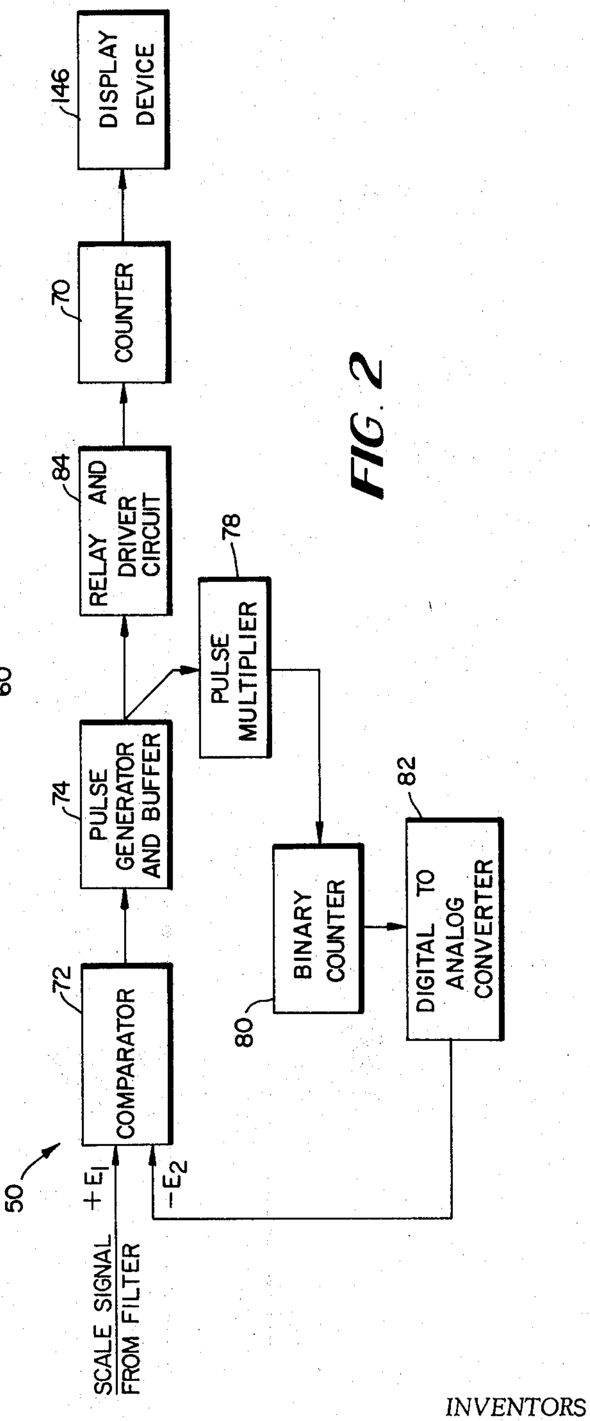
FIG. 2 is a schematic diagram of the totalizer shown in FIG. 1.

Referring to FIG. 2, totalizer 50 performs a transfer function for converting the weight representing analog signal $E_1$ into a train of digital impulses that are capable of driving a suitable counter 70. For this purpose, totalizer 50 comprises a signal comparator circuit 72, a pulse generator and buffer circuit 74, a pulse multiplier 78, a binary counter 80 and a digital-to-analog converter 82. Totalizer 50 may also include a relay and driver circuit 84 for counter 70.

As will be described in detail shortly, comparator circuit 72 effectively operates as a polarity detector to detect polarity changes of the algebraic summation of the d.c. input signal voltages to the comparator. The output of comparator circuit 72 will be either a logic 1 (high) or a logic 0 (low) depending upon the polarity of the algebraic summation of the analog input signals.

In this description a logic or logical 1 or a "high" designates a positive d.c. signal voltage such as, for example, +10v. A logic or logical 0 or a "low" designates a substantially zero d.c. signal voltage. The disclosure herein assumes positive logic purely for the purpose of description.

The output logic state of comparator 72 is applied to the input of pulse generator circuit 74, and in response to a predetermined one of the two comparator output logic states, circuit 74 is activated to supply a serial train of pulses in which the pulse repetition frequency is substantially constant. These pulses are serially applied to circuit 84 to be counted in by counter 70. These pulses are also serially applied to the input of pulse multiplier 78 which multiplies the number of pulses in the train by a pre-selected scaling factor.

The output of pulse multiplier is a train of serial pulses in which the pulse repetition frequency is also substantially constant and in which the number of pulses is a preselected multiple of the number of pulses in the pulse train applied to the input of the multiplier.

The pulses in the train at the output of multiplier 78 are serially applied to the input of binary counter 80. These pulses are counted in by counter 80, and the output of counter 80 is a binary number that is equivalent to the number of counted pulses.

Alternatively, multiplier 78 may be eliminated from the active totalizer circuit, and the pulse train supplied at the output of the pulse generator circuit 74 may be applied directly to the serial input of counter 80. The advantage of utilizing multiplier 78 will be explained later on.

The output of counter 80 is applied to the input of the digital-to-analog converter 82 which converts the binary digital signal into a d.c. signal voltage whose voltage level is proportional to the number of pulses counted in by counter 80 and hence to the number of pulses supplied by the pulse generator circuit 74.

The analog output ($E_2$) of converter 82 is fed back to the input of comparator 72 with a polarity that is opposite to that of the conditioned, filtered, weight-representing signal voltage $E_1$ that originally produced the pulse train.

Figures 3, 4, 5:
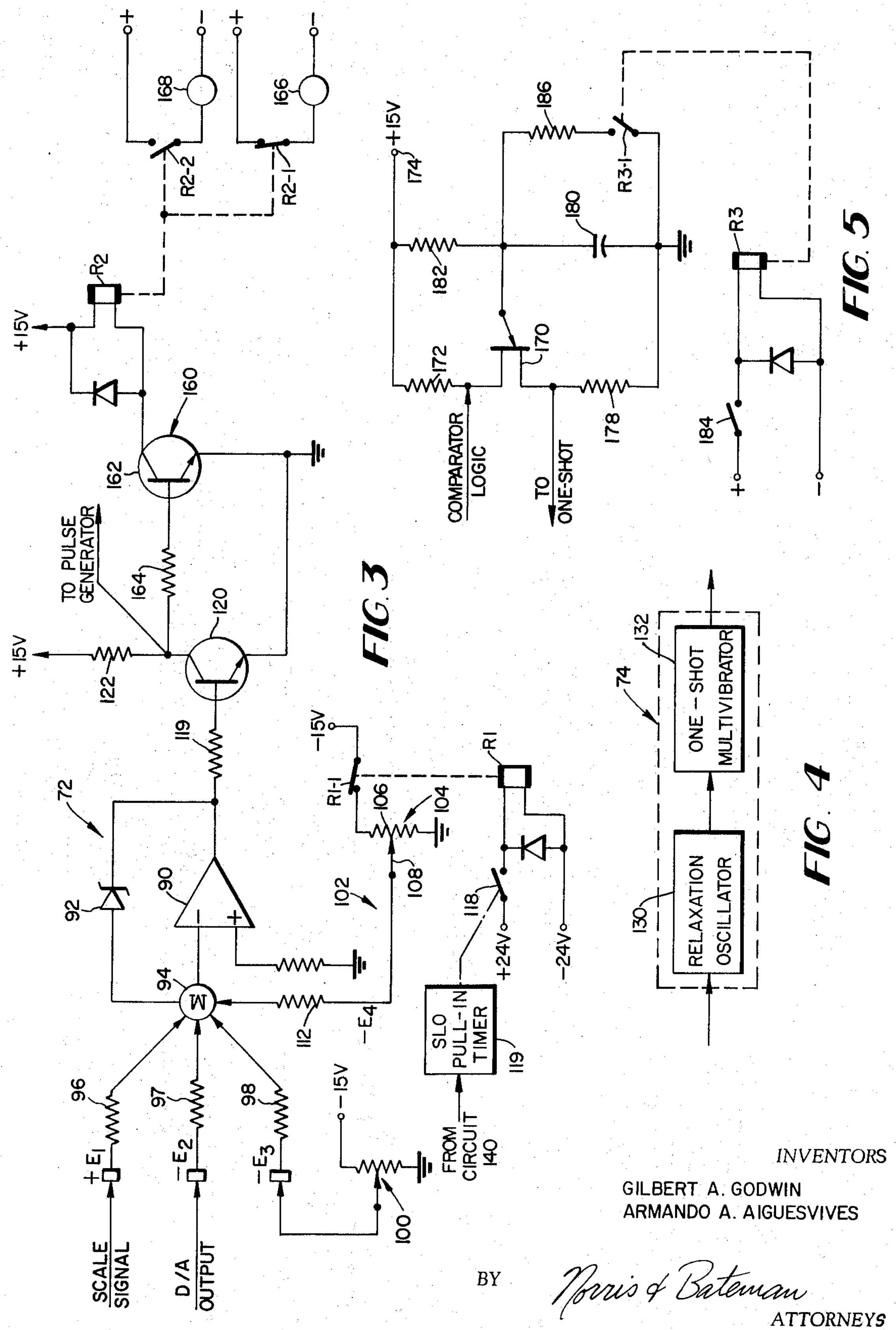
FIG. 3 is a schematic diagram of the signal comparator circuit shown in FIG. 2.
FIG. 4 is a schematic diagram of the pulse generator shown in FIG. 2.
FIG. 5 is a schematic diagram of the relaxation oscillator shown in FIG. 4.

Referring to FIG. 3, the comparator in circuit 72 comprises an operational amplifier 90 and a 10 volt zener diode 92. Diode 92 has its anode gate connected to a signal summing junction 94 and its cathode gate connected to the output of amplifier 90 to thus provide a feedback for controlling the gain of the amplifier. Summing junction 94 is connected to the inverting input terminal of amplifier 90, and the non-inverting input of amplifier 90 is connected through a resistor to ground. This type of comparator is described in the previously identified U.S. Pat. No. 3,528,518.

When the algebraic summation of the d.c. signal voltages applied to summing junction 94 is at least slightly negative, the output of amplifier 90 goes high (a logical 1) and will be held at the zener voltage (10v in this example) by the reverse bias of zener diode 92. When the algebraic summation of signal voltages applied to the summing junction becomes zero or positive, zener diode 92 will be forward biased and the output of amplifier 90 will become substantially zero volts or a logical 0 since the potential at junction 94 does not deviate substantially from zero.

As shown in FIG. 3, the conditioned weight-representing signal voltage $E_1$ from filter 42 and the analog signal voltage $-E_2$ from the output of converter 82 are fed to summing junction 94 respectively through summing resistors 96 and 97. Since the polarities of these two signal voltages are opposite, the output signal voltage of converter 82 will offset or effectively tare the weight-representing signal voltage. In this example, the weight-representing signal voltage $E_1$ has been selected as positive, and the output $E_2$ of converter 82 is negative. The range of voltage $E_1$ may, by way of example, be zero to +10v, with 10v representing the maximum capacity of the scale.

Advantageously, a small negative reference signal voltage ($-E_3$) may also be applied to summing junction 94 through another summing resistor 98. Reference voltage ($-E_3$) may be developed by a potentiometer 100. Reference voltage ($-E_3$) is relatively small and may be utilized to compensate for offsets in the circuit. It also has the effect of slightly shifting the weight-representing voltage level at which pulse generator circuit 74 is enabled to start supplying pulses. For example, reference signal voltage $E_3$ may be set at $-¼$v so that a weight representing signal voltage level in excess of ¼v is needed to change the logic level at the output of amplifier 90. The circuit will then be adjusted (as by potentiometer 60) to provide $E_1$ with a =¼v value when no material is in hopper 22. This enables signal $E_1$ to maintain a positive value even though the scale may be moved slightly in a direction that is below zero.

In addition to the foregoing signal voltages, a fourth signal voltage ($-E_4$), having a polarity that is the same as signal voltages $E_2$ and $E_3$, may advantageously be provided for under circumsances where the signal voltage $E_1$ overshoots its steady state, weight-representing value. Signal voltage $E_1$ may overshoot its steady state value due, for example, to underdamping, inertia or impact resulting from a relatively sudden application (i.e., step input) of a load to be weighed. The output of converter 82 will follow the overshoot as it increases, but will not follow the return of the overshoot as it peaks out and returns to its steady state value. To compensate for this condition and to thereby improve the accuracy of this weighing system, an overshoot network 102 is included with comparator circuit 72 to supply signal voltage $E_4$ which may be developed by a potentiometer 104 and which is selectively preset to offset an expected overshoot in signal voltage $E_1$.

Potentiometer 104 has a resistor 106 which is connected through a set of normally closed contacts R1-1 of a relay R1 to the negative terminal of a suitable d.c. voltage source. The other side of resistor 106 is grounded. The wiper 108 of potentiometer 104 is connected through a summing resistor 112 to summing junction 94.

Relay R1 is serially connected with a switch 118 across a suitable d.c. power source. Thus, when switch 118 is open and relay R1 is consequently de-energized, contacts R1-1 are closed to apply the negative signal voltage $E_4$ to summing junction 94. When relay R1 is energized by closing switch 118, contacts R1-1 open to remove signal voltage $E_4$ from summing junction 94.

Switch 118 may operatively be connected to an unshown, conventional, suitable motion detector which, in turn, is operatively connected to lever 24 so that when lever 24 arrives at its stabilized, balanced position upon completing the delivery of material to hopper 22, switch 118 will be actuated to its closed position, thereby energizing relay R1 to remove signal voltage $E_4$ from junction 94. At this time the transient overshoot in signal voltage $E_1$ will have peaked out, and signal voltage $E_1$ will have settled at its steady state value.

Alternatively, a final stop or cutoff relay (not shown) in a weight selection and material delivery control circuit 140 (FIG. 1) may be utilized to operate switch 118 through a slow pull-in timer 119 (FIG. 3). Circuit 140 advantageously is the same as the weight selection and material delivery control circuit disclosed in the previously identified U.S. Pat. No. 3,528,518, and the above-mentioned final stop relay is designated at EP-S in U.S. Pat. No. 3,528,518. When the above-mentioned final stop relay is operated to stop delivery of a material, it will also operate timer 119, and after a short time delay to permit the scale parts to stabilze, timer 119 actuates switch 118 to its closed position.

Considering all four comparator input signal voltages shown in FIG. 3, it will be appreciated that when the algebraic summation of signal voltages $E_1$, $E_2$, $E_3$ and $E_4$ is negative, the output of amplifier 90 is high or a logic 1, and when the algebraic summation of signal voltages $E_1$, $E_2$, $E_3$ and $E_4$ goes positive, as by increasing signal voltage $E_1$, the output of amplifier 90 goes low and is substantially zero volts.

The output of amplifier 90 is cnnected through a biasing resistor 119 to the base of an NPN transistor 120. The emitter of transistor 120 is connected to ground, and the collector of transistor 120 is connected to the logic input of pulse generator circuit 74 and also through a resistor 122 to the positive terminal of a suitable d.c. power supply source. Thus when the output of amplifier 90 is low, transistor 120 is turned off, and the voltage at the collector of the transistor will be high or a logic 1. When the output of amplifier 90 goes high, transistor 120 conducts, and the voltage at the collector of the transistor consequently goes low or becomes a logic 0.

As shown in FIG. 4, pulse generator circuit 74 comprises a suitable, conventional relaxation oscillator 130 which is biased on and off by variation of the voltage on the collector of transistor 120. When the voltage on the collector of transistor 120 is high or a logic 1, oscillator 130 is biased on to start oscillating. As a result, pulses of substantially constant repetition frequency will be generated and applied to the input of a one shot multivibrator 132.

The oscillation frequency of oscillator 130 may be of any suitable value such as, for example, 40HZ. It wil be appreciated that oscillator 130 is free running in that it will oscillate to generate impulses as long as comparator circuit 72 applies a logic 1 to the input circuit of the oscillator.

The output of oscillator 130 drives one shot multivibrator 132 which may be of any suitable form for determining the width of the output pulse. One shot multivibrator 132 will be triggered each time an impulse is supplied by oscillator 130. Thus the output of multivibrator 132 is a train of serial pulses in which the pulse repetition frequency is substantially constant and in which the number of pulses is equal to the number of impulses supplied by oscillator 130. When the 10 volt biasing voltage (a logic 1) is applied to the base of transistor 120, transistor 120 becomes conductive, and since the transistor emitter is at ground potential, the collector voltage will go substantially to zero volts or a logic 0. This logic condition biases oscillator 130 off with the result that it will stop oscillating. The generation of pulses at the output of one shot multivibrator 132 will therefore cease.

The pulses at the output of one shot multivibrator 132 are serially fed to relay and driver circuit 84 and also to multiplier 78 which may be of any suitable conventional form. Multiplier 78 is selectively preconditioned to produce a corresponding train of pulses in which the pulse repetition frequency is constant and in which the number of pulses is equal to the number of pulses fed to the multiplier multiplied by a preselected integer. For example, the number of pulses supplied at the output of multiplier 78 may be four times the number of pulses fed to the input of the multiplier by one shot multivibrator 132.

Counter number of pulses supplied by multiplier 78 and provides a binary output that is equivalent to the number of counted pulses. The binary output of counter 80 is applied to the digital input of converter 82 for conversion. Counter 80 and converter 82 each may be of any suitable conventional form. Converter 82 converts the digital, binary output of counter 80 into a d.c. signal voltage whose voltage level is proportional to the number of pulses counted in by counter 80. The output of converter 82 is scaled to be comparable with signal voltage $E_1$. This may be accomplished by means of an unshown trimmer in converter 82. By adjusting the converter's trimmer, the output voltage of converter 82 is calibrated at full count (i.e., full capacity of the scale) to the input signal voltage $E_1$. Thus each pulse-produced incremental increase in signal voltage $E_2$ is predetermined and calibrated relative to signal voltage $E_1$.

plied by pulse generator circuit 74 a greater part of the converter's available range is utilized to convert the digital signal into an analog signal. As a result, the linearity, resolution and stabiity of the digital-to-analog conversion is improved to provide for a more accurate conversion as compared with the direct conversion of the un-multiplied pulse stream from the pulse generator. For example, if the number of pulses in the pulse generator-produced stream is multiplied by four by multiplier 78, the conversion range that is utilized to convert the multiplied pulse stream into an analog signal is increased four fold to thus provide an increase in resolution, accuracy and stability.

Considering all four signal voltages $E_1$, $E_2$, $E_3$, and $E_4$, it will be appreicated that when hopper 22 is empty, the algebraic summation of the signal voltage at summing junction 94 will be slightlY negatiVe. At this stage, relay R1 will be de-energized to apply the negative signal voltage $E_4$ to junction 94. Zener diode 92 will therefore be reversed biased to provide a logic 1 at the output of amplifier 90. As a result the collector voltage of transistor 120 will be a logic 0 to bias oscillator 130 off.

When delivery of material to hopper 22 is initiated (as by a free falling stream from a storage bin or a delivery conveyor), the scale signal voltage $E_1$ will increase, and when the absolute magnitude of signal voltage $E_1$ becomes greater than the sum of the absolute magnitudes of signal voltages $E_2$, $E_3$ and $E_4$, the algebraic summation of voltages at junction 94 becomes positive to forward bias diode 92. As a result, the collector voltage of transistor 120 becomes a logic 1, and oscillator 130 will therefore be biased on.

Pulses will now be serially generated and counted in by counter 70 through drive circuit 84. At the same time, these pulses are applied to multiplier 78 in the feedback loop that is defined by multiplier 78, counter 80, and converter 82. The pulses in the multiplied pulse stream are counted in by counter 80, and the resulting digital signal is applied to converter 82. The converted, analog output ($E_2$) of converter 82 is fed back to junction 94 to offset or tare the scale signal voltage $E_1$.

Since count-in of pulses by counter 80 is serial, the output of counter 80 is digitially increasing for each pulse that is counted. As a result, the converter-produced signal voltage $E_2$, in following the output of counter 80 will be in the form of a staircase that is increasing in a negative direction and that has a step increase for each pulse that is counted in by counter 80.

As long as the algebraic summation of voltages at junction 94 remain positive, pulse generator circuit 74 will continue to generate pulses. Assume now that the weight of material in hopper 22 is increasing at a rate that is slower than the time lags and slew rates involved in producing and applying the converter signal voltage $E_2$ to junction 94. The rate at which the magnitude of signal voltage $E_2$ is increasing in a negative direction will therefore be greater than the rate at which the magnitude of signal voltage $E_1$ is increasing in a positive direction.

After a short time delay, which is a function of the weight of material sensed by load cell 28, the algebraic summation of signal voltages at junction 94 will become zero and will start to go negative when the absolute magnitude of signal voltage $E_2$ has become sufficiently great that the sum of the absolute absolute magnitudes of voltages $E_2$, $E_3$ and $E_4$ becomes equal to the absolute magnitude of signal voltage $E_1$.

When the algebraic summation of signal voltages at junction 94 starts to go negative, the logic state at the output of amplifier 90 changes to a high. The collector voltage logic state at transistor 120 therefor changes to a low to bias oscillator 130 off, thereby stopping the generation of pulses. The absolute magnitude of signal voltage $E_2$ may therefore stop increasing momentarily, but since material is continuously being fed to hopper 22, the algebraic summation of signal voltages junction 94 will again go positive to again cause oscillator 130 to be biased on, thereby renewing the generation of pulses. This cyclic operation will be repeated until all of the desired amount of material is delivered to hopper 22 and the delivery of material to hopper 22 is interrupted or until operation of the totalizer circuit is selectively interrupted.

Assume that it was desired to deliver 100 pounds of material to hopper 22. When the weight-representing or scale signal voltage, say at the output of filter 42, reaches a predetermined voltage, it conditions the weight selection and material delivery control circuit 140 (FIG. 1) which, in turn, conditions a material delivery mechanism 142 (FIG. 1) to interrupt the delivery of material to hopper 22. Mechanism 142 may be the same as that described in the previously identified U.S. Pat. No. 3,528,518.

Following interruption of the delivery of material to hopper 22, the scale mechanism parts will stabilize to cause energization of relay R1. As a result, signal voltage $E_4$ will be removed from junction 94. The algebraic summation of the remaining signal voltages ($E_1$, $E_2$ and $E_3$) at junction 94 will now go positive, and oscillator 130 will therefore be biased on again to generate a number of pulses that, upon digital-to-analog conversion, is equivalent to the magnitude of signal voltage $E_4$.

In the event that the weight of a load to be weighed is suddenly applied to load cell 28 or other transducer in the circuit, signal voltage $E_1$ will suddenly increase to a level that is proportional to the weight of the applied. This condition may occur in a vehicle weighing system where the vehicle is driven onto the load-receiving scale platform. Under such conditions, signal voltage $E_1$ will be a step input.

Due to the time lags and slew rates throughout the feedback loop in totalizer 50, the algebraic summation of signal voltages at junction 94 will remain positive until the required number of pulses have been generated, converted and fed back in a analog form to junction 94 to reduce the algebraic summation to zero. The same condition can occur if material is delivered at a sufficiently rapid rate that the increasing signal voltage $E_1$ remains ahead of the rate at which the absolute magnitude of signal voltage $E_2$ in increasing.

From the foregoing it will be appreciated that the number of pulses generated by pulse generator circuit 74 and counted in by counter 70 will be proportional to the weight-produced change in signal voltage $E_1$ and, consequently, proportional to the weight of the material delivered to the hopper. The pulse count-in by counter 70 may be displayed by a display device 146 (FIG. 2) as weight or it may be recorded as weight by an unshown printer. It is clear that the change in signal voltage $E_1$ will be proportional to the weight of material delivered to the hopper.

More particularly, it will be appreciated that the absolute magnitude of signal voltage $E_2$ cumulatively increases by a constant incremental magnitude for each pulse counted in by counter 80. Since the number of incremental increases in signal voltage $E_2$ is proportional to the number of pulses supplied by generator 74 and since the magnitude of the incremental increases of signal voltage $E_2$ are calibrated relative to signal voltage $E_1$, as previously described, the number of pulses produced by generator 74 in response to the application of a given load will be proportional to the weight produced increase in signal voltage $E_1$.

It will be appreciated that signal voltages $E_3$ and $E_4$ are optionable and may be eliminated so that the totalizer circuit will then respond only to signal voltages $E_1$ and $E_2$. Operation of the totalizer circuit without signal voltages $E_3$ and $E_4$ corresponds to that already described.

To determine when up-dating of the signal voltage condition at junction 94 is completed and counter 70 has therefore counted in the weight-representing number of pulses, circuit 72 may advantageously be provided with an up-dating-indicating network 160 (FIG. 3) to reduce delays in such weighing operations as, for example, batching weighing. Network 160 comprises a transistor 162 and a relay R2. The base of transistor 162 is connected through a biasing resistor 164 to the collector of transistor 120, and the emitter of transistor 162 is connected directly to ground as shown. The collector of transistor 162 is connected to one terminal of the operating winding of relay R2, and the other terminal of the operating winding of relay R2 is connected to a positive terminal of a suitable d.c. power source.

Relay R2 has a set of normally closed contacts R2-1 asnd a set or normally open contacts R2-2 for respectively controlling current supply to indicators 166 and 168. As shown, contacts R2-1 are in series with indicator 166 across a suitable power source, and contacts R2-2 are in series with indicator 168 across a suitable power source.

Alternatively or additionally, contact R2-1 and R2-2 may be suitably connected in control circuit 140 to provide an additional control for the successive delivery of a plurality of materials in a batching operation. Also, contacts R2-1 and R2-2 may be utilized to control operation of a printer.

In operation of network 160 it is clear that relay R2 will be energized when the logic state at the collector of transistor 120 is high and that relay R2 will be de-energized when the logic state at the collector of transistor 120 is low or substantially zero volts. Thus, contacts R2-1 and R2-2 will respectively open and close to respectively de-activate or de-energize indicator 166 and activate or de-energize indicator 168. Indicators 166 and 168 may be lamps or relay operating windings.

With the foregoing circuitry indicators 166 and 168 will respectively be de-energized and energized when oscillator 130 is biased on. When oscillator 130 is biased off, indicators 166 and 168 will respectively be energized and de-energized. When oscillator 30 is biased off by the change in logic state at the collector of transistor 120, the totalizer circuit has up-dated itself and is awaiting a further or continued increase, if any, in signal voltage $E_1$.

Referring to FIG. 5, relaxation oscillator 130 may be of any suitable, conventional form such as that shown in FIG. 13.21 on page 315 of the 1964 edition of the General Electric Transistor Manual. This type of oscillator comprises a unijunction transistor 170 having its ohmic contact base two connected through a resistor 172 to a positive terminal 174 of a suitable d.c. source. Base two is connected to receive the biasing logic state from the output of comparator circuit 72. The other ohmic contact base one of transistor 170 is connected to the input of the one shot multivibrator 132 and through a resistor 178 to ground. A capacitor 180 is connected between the emitter of transistor 170 and ground and is charged from terminal 174 through a resistor 182.

Capacitor 180 charges through resistor 182 until the emitter to base one junction of transistor 170 is forward biased. At this potential capacitor 180 discharges through the emitter to base one junction, and when the emitter potential drops to a predetermined level the junction no longer conducts, and the cycle begins again. As shown, when the logic state at the collector of transistor 120 is high, unijunction transistor 170 will be biased on, and when the logic state at the output of transistor is low, transistor 170 is biased off.

According to a further feature of this invention the relaxation oscillator may be selectively disabled independently of the logic state at the collector of transistor 120. This is accomplished by a relay R3 which is in series with a switch 184 across a suitable d.c. power source. Relay R3 operates a set of normally open contacts R3-1 which is in series with a shunting resistor 186. By closing contacts R3-1, resistor 186 is bridged across ground and the emitter of transistor 170 in shunting relation to capactiro 180 to short out capacitor 180 and to thereby prevent capacitor 180 from being charged. Thus, by selectively closing switch 184, relay R3 is energized to shunt capacitor 180 with resistor 186 for preventing capacitor 180 from being charged. As a result, relaxation oscillator 130 is selectively disabled regardless of the logic state at the collector of transistor 120. The various components in totalizer 50, may selectively be reset by any suitable unshown means such as a switch that is connected to apply the proper voltage level to the components requiring reset.

What is claimed and desired to be secured by Letters Patent is:

1. In a weighing system, means for receiving a load to be weighed, means providing a first d.c. signal whose change in magnitude is indicative of the weight of the load applied to said load-receiving means, a first circuit for serially supplying pulses, said first circuit comprising pulse generator means that produce said pulses at a substantially constant repetition frequency, a second circuit connected to said first circuit for cumulatively converting said pulses into a second d.c. signal, a third circuit responsive to at least said first and second d.c. signals for limiting the pulses supplied by said first circuit to a number that is substantially proportional to the weight-indicating change in the magnitude of said first signal, a pulse counter connected to receive the pulses supplied by said first circuit to cumulatively count the number of pulses supplied by said first circuit, said third circuit comprising polarity detecting means, and said first and second signals being applied to the input of said detecting means with opposite polarities, said detecting means being operative to produce an output signal that is controlled by the polarity of the algebraic summation of at least said first and second signals, circuit connection means for applying said output signal to condition said first circuit for starting and stopping the supply of said pulses, further circuit connection means for connecting said second circuit to said first circuit independently of said pulse counter, said pulse generator means comprising an oscillator that is responsive to different predetermined magnitudes of said output signal for starting and stopping oscillation, and means for stopping oscillation of said oscillator regardless of the magnitude of said output signal, said oscillator being a relaxation oscillator having a capacitor and a charging and discharging network for said capacitor for cyclically producing impulses at the output of said oscillator, said means for stopping oscillation of said oscillator regardless of the magnitude of said output signal comprising resistance means and means for selectively connecting said resistance means in shunting relation to said capacitor to prevent said capactior from being charged.

2. In a weighing system, means for receiving a load to be weighed, means providing a first d.c. signal whose change in magnitude is indicative of the weight of the load applied to said load-receiving means, a pulse generator for supplying pulses at a substantially constant repetition frequency, a first circuit electrically connected to said pulse generator for cumulatively converting the pulses supplied by said pulse generator into a second d.c. signal to provide said second d.c. signal with an absolute magnitude that increases incrementally as pulses are supplied by said gerarator, a second circuit responsive to at least said first and second d.c. signals for conditioning said pulse generator to supply said pulses and to stop the supply of said pulses to provide a pulse generator-produced pulse train in which the number of pulses is substantially proportional to the weight-indicating change in the magnitude of said first signal, and a pulse counter for counting the number of pulses in each of the pulse trains that is provided by said pulse generator, said pulse counter and said first circuit each being connected to said pulse generator to receive said pulses independently of each other for rendering said pulse counter effective to totalize the generator-produced pulses for successively weighed loads.

3. The weighing system defined in claim 2 wherein said first circuit comprises a ditital-to-analog converter, pulse mutltiplying means connected to the output of said pulse generator to supply a pulse train in which the number of pulses is a pre-selected multiple of the number of pulses produced by said pulse generator, and counter means for counting in the number of pulses in the train supplied by said pulse multiplying means and for applying a digital signal representing the number of counted pulses to the input of said converter for conversion into said second d.c. signal.

4. The weighing system defined in claim 2 wherein said second signal is provided with a polarity opposite to that of said first signal, and wherein said second circuit comprises a signal comparator that is responsive to the algebraic summation of at least said first and second d.c. signals for starting and stopping operation of said pulse generator.

5. The weighing system defined in claim 4 comprising means for providing a third d.c. signal and for applying said third d.c. signal to the input of said comparator along with said first and second signals and with a polarity that is opposite to said first signal, said comparator providing an output signal that is responsive to the polarity of the algebraic summation of said first, second, and third signals to start and stop the operation of said pulse generator, said third signal being selectively pre-set to a magnitude that offsets any overshoot of said first signal relative to a steady state, weight-representing value.

6. The weighing system defined in claim 2 wherein said second signal is provided with a polarity opposite to that of said first signal, wherein said second circuit comprises a signal comparator, wherein circuit connection means are provided for applying at least said first and second signals to the input of said comparator, wherein said comparator is responsive to the algebraic summation of at least said first and second signals to supply a d.c. output signal that has first and second different, predetermined logic levels when said algebraic summation is respectively positive and negative, and wherein further circuit connection means are provided for applying said d.c. output signal to said pulse generator said pulse generator means being responsive to one of said logic levels to start generating pulses and to the other of said logic levels to stop generating pulses.

7. The weighing system defined in claim 6 wherein said signal comparator comprises an operational amplifier a signal summing junction for receiving said first and second signals and connected to the input of said amplifier, and a feedback connected between said summing junction and the output of said amplifier and having a zener diode for maintaining the output of said amplifier at the logic level that is determined by the polarity of the algebraic summation of signals applied to said summing junction.

8. The weighing system defined in claim 6 comprising means controlled by said second circuit for providing an indication when said d.c. output signal is at the logic level for stopping operation of said pulse generator.

9. The weighing system defined in claim 6 wherein said pulse generator comprises a relaxation oscillator that is responsive to said one of said logic levels to start oscillating and to said other of said logic levels to stop oscillating.

10. The weighing system defined in claim 9 comprising means for selectively preventing said oscillator from oscillating regardless of the logic level of said d.c. output signal.

11. In a weighing system, means for receiving a load to be weighed, means providing a first d.c. signal whose change in magnitude is indicative of the weight of the load applied to said load-receiving means, a pulse generator for supplying pulses at a substantially constant repetition frequency, a first circuit connected to said pulse generator for cumulatively converting said pulses into a second d.c. signal, said second d.c. signal having a polarity that is opposite to that of said first d.c. signal, a second circuit including pulse detecting means for receiving said first and second d.c. signals, means for selectively applying a third d.c. signal to said detecting means, said third d.c. signal having a polarity opposite to that of said first d.c. signal and a selectively preset magnitude that cancels any overshoot of said first d.c. signal relative to a steady state weight-representing value thereof, said detecting means being responsive to said first, second and thrid d.c. signals to produce an output signal that is controlled by the polarity of the algebraic summation of said first, second and third d.c. signals, said pulse generator being conditioned by said output signal for starting and stopping the supply of said pulses to provide a pulse train in which the number of pulses is substantially proportional to the weight-indicating change in the magnitude of said first d.c. signal, and a pulse counter for counting the number of pulses in each pulse train that is provided by said pulse generator, said pulse counter and said first circuit each being connected to said pulse generator to receive said pulses independently of each other for rendering said pulse counter effective to totalize the generator-produced pulses for successively weighed loads.

* * * * *

UNITED STATES PATENT OFFICE
CERTIFICATE OF CORRECTION

Patent No. 3,794,815 Dated February 26, 1974

Inventor(s) Gilbert A. Godwin and Armando A. Aiguesvives

It is certified that error appears in the above-identified patent and that said Letters Patent are hereby corrected as shown below:

Column 2, line 14, after "another" delete --circuit--.

Column 5, line 29, change "=" to --+--.

Column 6, line 29, change "cnnected" to --connected--.

Column 7, line 19, after "Counter" add --80 counts in the--.

Column 7, line 36, after "$E_1$." insert --By multiplying the number of pulses in the train sup---.

Column 7, line 41, change "stabiity" to --stability--.

Column 7, line 54, change "slightY negatiVe" to --slighty negative--.

Column 8, line 13, change "digitially" to --digitally--.

Column 8, line 35, after "absolute" delete --absolute--.

Column 10, line 2, change "asnd" to --and--.

Column 10, line 28, change "30" to --130--.

Column 10, line 67, change "capactiro" to --capacitor--.

Column 11, line 19, change "produce" to --produces--.

Column 11, line 65, change "gererator" to --generator--.

Column 12, line 13, change "ditital" to --digital--.

UNITED STATES PATENT OFFICE
CERTIFICATE OF CORRECTION

Patent No. 3,794,815 Dated February 26, 1974

Inventor(s) Gilbert A. Godwin and Armando A. Aiguesvives

It is certified that error appears in the above-identified patent and that said Letters Patent are hereby corrected as shown below:

Column 12, line 55, after "tor" insert --,--.

Column 12, line 55, after "generator" delete --means--.

Column 12, line 60, after "fier" insert --,--.

Column 14, line 8, change "thrid" to --third--.

Signed and sealed this 6th day of August 1974.

(SEAL)
Attest:

McCOY M. GIBSON, JR.
Attesting Officer

C. MARSHALL DANN
Commissioner of Patents